H. E. FOURCHER.
COTTON PICKER.
APPLICATION FILED MAR. 14, 1911. RENEWED JULY 31, 1912.
1,054,836.
Patented Mar. 4, 1913.
2 SHEETS—SHEET 1.
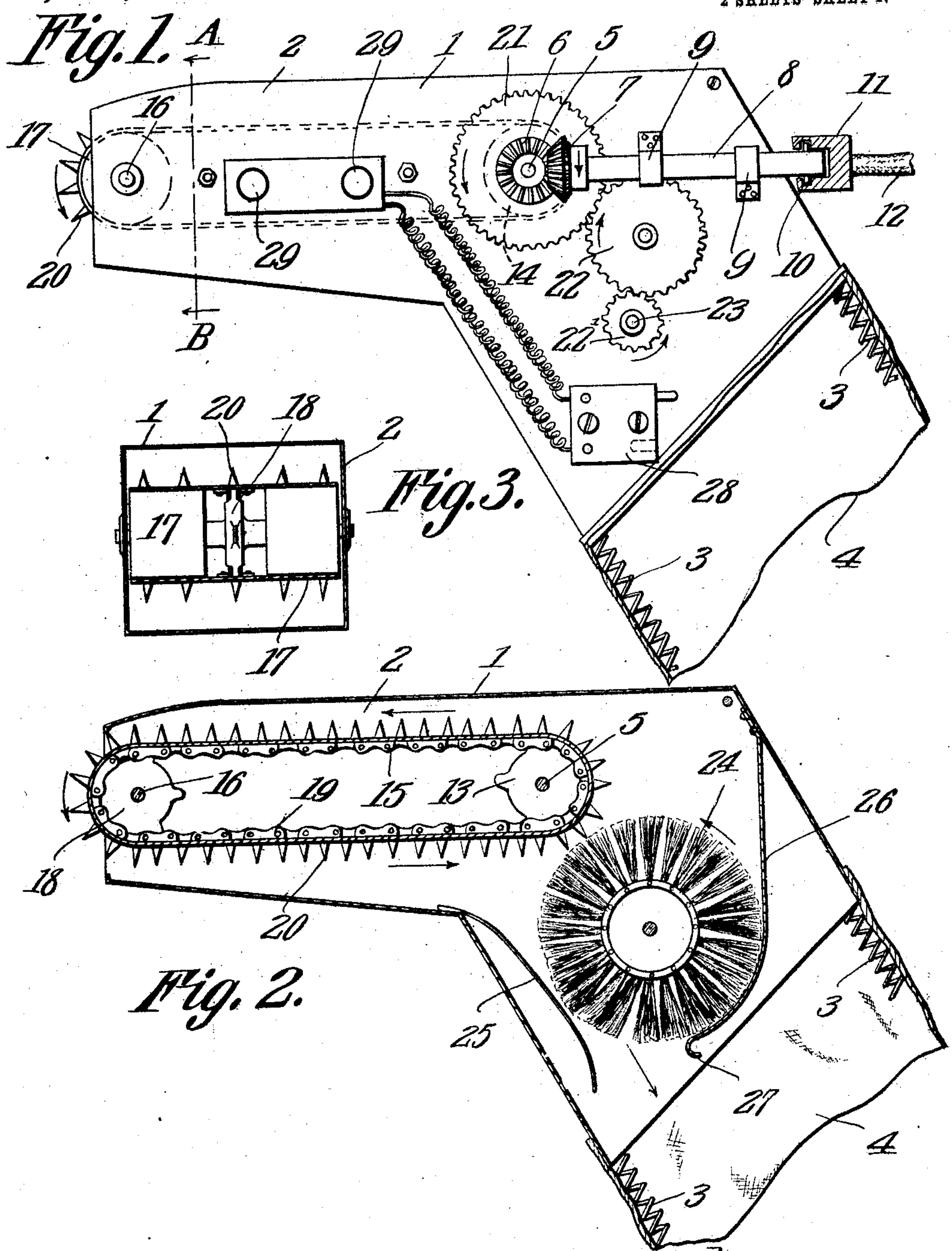
Witnesses
J. R. Sownley
Herbert D. Lawson
H. E. Fourcher Inventor,
by C. A. Snow & Co. Attorneys.

H. E. FOURCHER.
COTTON PICKER.
APPLICATION FILED MAR. 14, 1911. RENEWED JULY 31, 1912.
1,054,836.
Patented Mar. 4, 1913.
2 SHEETS—SHEET 2.
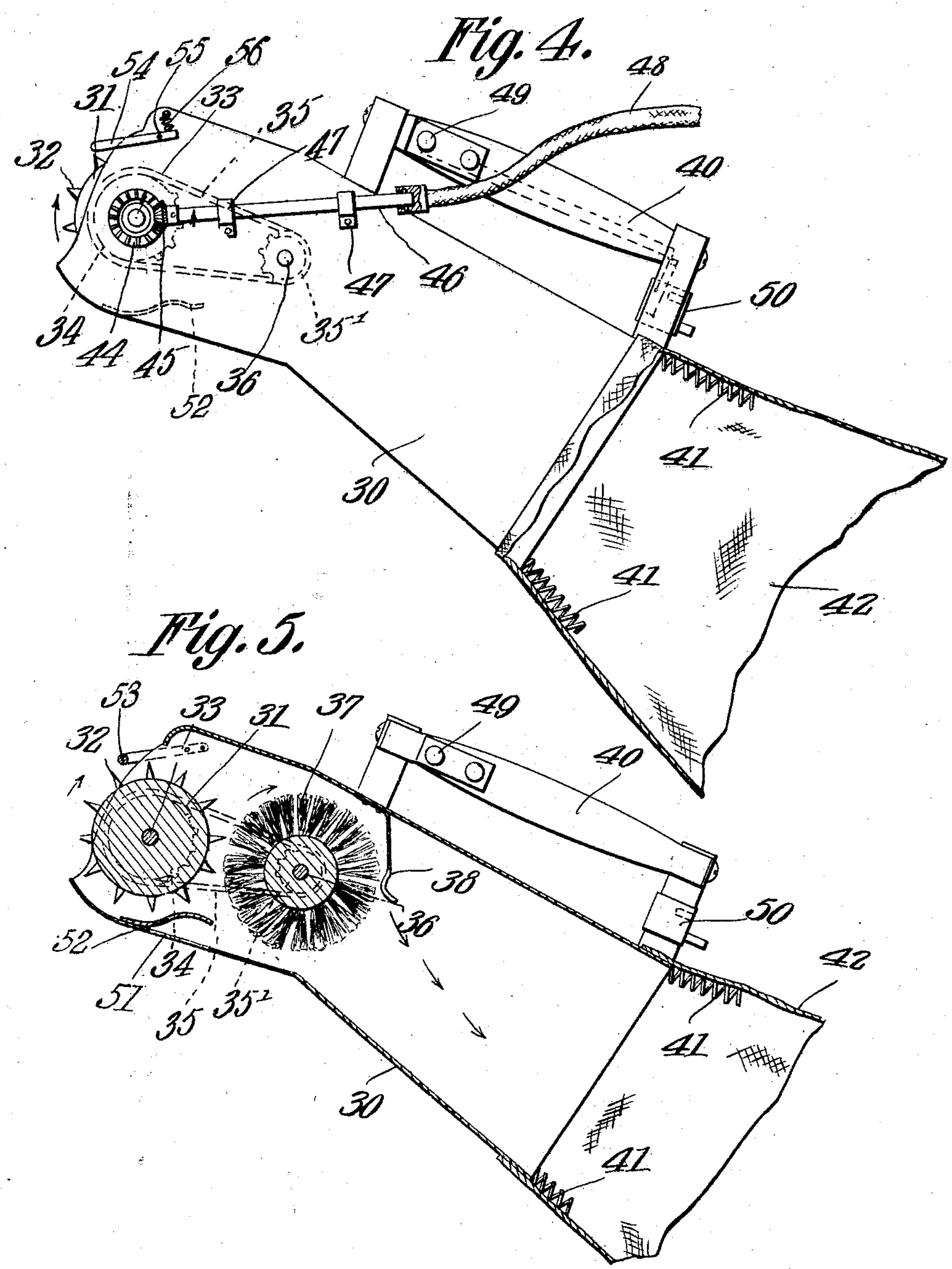
Witnesses
[signatures]
H. E. Fourcher Inventor,
by C. A. Snow & Co. Attorneys.

UNITED STATES PATENT OFFICE.

HARRY E. FOURCHER, OF AUGUSTA, GEORGIA.

COTTON-PICKER.

1,054,836. Specification of Letters Patent. Patented Mar. 4, 1913.

Application filed March 14, 1911, Serial No. 614,497. Renewed July 31, 1912. Serial No. 712,570.

*To all whom it may concern:*

Be it known that I, HARRY E. FOURCHER, a citizen of the United States, residing at Augusta, in the county of Richmond and State of Georgia, have invented a new and useful Cotton-Picker, of which the following is a specification.

This invention relates to cotton pickers, its object being to provide a device of this character adapted to be carried by the operator and which includes mechanism for picking the cotton from the plant and throwing it into a bag or other suitable receptacle carried by the operator, the actuating mechanism being driven by an electric motor of such size as to be conveniently carried.

With the foregoing and other objects in view which will appear as the description proceeds, the invention resides in the combination and arrangement of parts and in the details of construction hereinafter described and claimed.

In the accompanying drawings the preferred forms of the invention have been shown.

In said drawings; Figure 1 is a side elevation of the picker, a portion of the bag being shown in section. Fig. 2 is a central vertical longitudinal section through the picker and a portion of the bag. Fig. 3 is a section on line A—B Fig. 1. Fig. 4 is a side elevation of a modified form of picker, a portion of the bag being shown in section. Fig. 5 is a vertical longitudinal section through said modified form.

Referring to the figures by characters of reference 1 designates a casing preferably of aluminum or other light material, this casing including a hollow arm 2 preferably rectangular in cross section, as indicated in Fig. 3 and open at its ends. The rear or base portion of the casing is also open and preferably rectangular in cross section, there being resilient bag engaging projections 3 extending from the corner portions of the base and adapted to project into the mouth of an elongated bag 4 so as to hold the said bag to the casing. A shaft 5 extends transversely through and is journaled within the casing adjacent the center thereof, this shaft receiving motion, through a bevel gear 6, from a gear 7 secured to a shaft 8, shown in Fig. 1, as journaled within brackets 9 secured to one side of the casing. Said shaft 8 has a coupling member 10 at one end thereof and adapted to be engaged by another coupling member 11 secured to one end of a flexible shaft 12. This shaft is adapted to be driven by a suitable motor, not shown, and which may be carried by the operator. A sprocket 13 is formed on or secured to the middle portion of shaft 5 and mounted on this shaft at opposite sides of the sprocket, are rolls 14 supporting an endless belt 15. Another shaft 16 is journaled in the inlet of the arm 1 and extends transversely of said arm, this shaft carrying rolls 17 which are similar to the rolls 14 and are spaced apart so as to receive between them a sprocket 18. The belt 15 is also mounted on these rolls 17 and secured to the inner face of the belt and along the longitudinal center thereof, is a chain 19 engaging the sprockets 13 and 18. Teeth 20 are secured to the belt and extend from the outer surface thereof, these teeth being arranged in any manner desired they being adapted, when moved out of the intake end of arm 2, to engage the cotton and tear it from the plants. A gear 21 is secured to the shaft 5 and meshes with another gear 22 which, in turn, drives a gear 22′ secured to a shaft 23 journaled within and extending transversely of the base portion of the casing 1. A cylindrical brush 24 is secured to and rotates with the shaft 23 and is adapted to engage the teeth 20 as they pass under the sprocket 13 and the rolls 14. The lower portion of the brush is arranged close to spring arms 25 and a guard or shield plate 26 is secured within the base portion of the casing and lies close to the back portion of the brush, the free end of this shield being rounded, as shown at 27, and there being a considerable space formed between this rounded portion and the arms 25. A switch socket 28 is attached to the casing 1 and is designed to be engaged by a plug, not shown, and which is electrically connected to a motor, not shown, and a source of electricity, not shown. This socket member 28 is also electrically connected to controlling buttons 29 mounted upon one wall of the arm 1, it being designed to so construct and arrange these buttons that, when one of them is depressed, a circuit is established from a source of electricity to the motor and the shaft 12 is therefore driven. When the other button 29 is depressed the circuit is broken. As the motor, and the means for controlling the same, constitute no part of the present invention, it has not been deemed necessary to illustrate the same in detail or to enter into an extended description thereof.

As has heretofore been stated, it is designed to provide a motor which can be readily carried by the operator, the bag 4 being also carried by him. The casing 1 is comparatively small and can be readily held in one or both hands. When the motor is set in motion, the shaft 12 will drive the shaft 8 and motion will be transmitted therefrom through gears 6 and 7 to the belt 15 carrying the picking teeth 20. At the same time brush 21, will be rotated at a greater speed than the shaft 5. When the intake end of the arm 1 is held close to a boll, the teeth will engage the cotton and tear it from the boll, actual experiment showing that only the fibrous cotton will be thus engaged and drawn into the casing, the boll and leaves being left upon the plant. As the cotton is conveyed into the casing, it is brought against the rapidly rotating brush 24 and the bristles of this brush engage the cotton and remove it from the teeth 20 and convey it into contact with the spring members 25. The tufts of bristles will thus be held back as they drag over the spring members 25 and as shown in Fig. 2, but as soon as these bristles leave the members 25, they will spring back to their initial positions relative to the brush core, thus flicking the cotton through the opening between the spring members 25 and the guard 26 and into the bag 4.

Instead of employing a picking belt such as has been shown and described, the casing 30 may be shaped as indicated in Figs. 4 and 5 and provided, in the inlet end thereof, with a roll 31 provided with picking teeth 32, a portion of the roll being adapted to project beyond the casing, as shown. The shaft 33 of this roll has a sprocket 34 secured to it at one end, and which drives a chain 35 engaging a sprocket 35′. Sprocket 35′ is secured to a shaft 36 also journaled within the casing. This shaft carries a brush 37 extending close to the roll 31 and the bristles of which are adapted to engage the cotton and remove it from the teeth 32 and convey it to a spring retaining member 38 having the same action as the member 25 heretofore described. A handle 40 may be mounted upon the casing 30 and said casing also has spring bag engaging members 41 adapted to project into a bag 42 and hold the mouth thereof open so as to receive cotton discharged from the casing 30. A gear 44 is secured upon shaft 33 and meshes with another gear 45 secured to a shaft 46. Said shaft is journaled in brackets 47 on the casing and is adapted to be coupled to a flexible shaft 48 extending to a motor, not shown. Handle 40 may be provided with controlling buttons 49 and with a switch socket 50 whereby the operation of the motor may be readily controlled.

In order to prevent a strong draft of air from blowing out through the inlet of the casing and thus interfering with the proper picking of the cotton, an outlet opening 51 is preferably formed in the bottom of the casing adjacent the roll 31, this opening being overhung by an inclined guard plate 52. As an additional means for preventing trash from entering the picker, a guard rod 53 is extended across the inlet opening of the casing 30 close to the circle described by the points of the teeth 32, this rod having terminal arms 54 pivotally connected to the sides of the casing as indicated at 55 and being attached to springs 56 which serve to hold the rod 53 yieldingly in normal position. When the roll 31 is rotating so as to convey the bolls to the casing 30, the rod 53 will be pressed upward to any necessary extent to permit the cotton to pass thereunder but any trash or other undesirable material will be pushed away from the teeth by the rod. With this modified structure the balance of the operation is practically the same as that described in connection with the forms shown in Figs. 1 to 3 inclusive. When the cotton is engaged by the teeth 32, it will be carried inwardly and engaged by the brush 37 whereupon it will be removed from the teeth and brought against the spring member 38. This member will cause the bristles of the brush to hold back until after they pass the member whereupon they will spring to their normal position and flick the cotton into the base portion of the casing and toward the bag 42.

What is claimed is:—

1. A cotton picker including a casing, a picking element movably mounted within the casing, a yieldable brush-bristle retarding device, and a brush coöperating with the retarding device and said element for removing material from said picking element and against the retarding device and flicking it from said device and out of the casing.

2. A cotton picker including a casing, a toothed picking device movably mounted therein, a revoluble brush for removing and conveying cotton from said picking device, and a retarding plate secured in the casing and constituting means for successively engaging, depressing and releasing the bristles of the brush whereby the cotton is flicked from the brush and out of the casing.

3. A cotton picker including a casing, an endless toothed picking device movably mounted within the casing, a brush-bristle retarding element, and a brush for removing and conveying cotton from the picking device, said brush and retarding element coöperating to flick the cotton from the brush and casing subsequent to its removal from the picking device.

4. A cotton picker including a casing having an intake opening and an outlet opening, an endless toothed picking device movably mounted within the casing and projecting beyond the intake opening, means for actuating said device, a brush for removing material from said device and means for successively depressing and releasing the bristles of the brush to flick the material from the brush and through the outlet opening, said means including a yieldable element secured in the casing and adjacent the brush.

5. A cotton picker including a casing having an intake opening and an outlet, an endless picking device movably mounted within the casing and projecting beyond the intake opening, a revoluble brush for removing material from said device, a shield within the casing and lying close to the brush, and yielding means coöperating with the brush and extending close to the shield, for successively retarding and releasing the bristles of the brush to flick the material from the brush.

6. A cotton picker including a casing adapted to be carried by the operator, an endless belt movably mounted with the casing, picking teeth extending from the belt, said belt projecting beyond the casing to engage the cotton to be picked, power operated means for actuating the belt, a brush for removing cotton from the teeth and means for retarding and then releasing the bristles of the brush to flick the cotton from the casing.

7. A cotton picker including a casing, a picking element movably mounted within the casing, a yieldable brush-bristle retarding device, a brush coöperating with the retarding device and said element for removing material from said device and flicking it from the casing, said casing having an outlet adjacent the picking element, and a shield extending partially across the outlet.

In testimony that I claim the foregoing as my own, I have hereto affixed my signature in the presence of two witnesses.

HARRY E. FOURCHER.

Witnesses:

BILLY BARKSDALE,

C. H. ODELL.